(12) United States Patent
Kwon (10) Patent No.: US 7,701,513 B2
(45) Date of Patent: Apr. 20, 2010

(54) VIDEO PROCESSING APPARATUS

(75) Inventor: Yong-hwan Kwon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1176 days.

(21) Appl. No.: 11/289,338

(22) Filed: Nov. 30, 2005

(65) Prior Publication Data
US 2006/0174272 A1 Aug. 3, 2006

(30) Foreign Application Priority Data
Jan. 31, 2005 (KR) .................. 10-2005-0008835

(51) Int. Cl.
*H04N 5/50* (2006.01)
(52) U.S. Cl. .................. 348/569; 348/731; 348/734
(58) Field of Classification Search ......... 348/563–564, 348/569–570, 731–733, 725, 734; 725/38, 725/57; *H04N 5/50, 5/445, 5/44*
See application file for complete search history.

(56) References Cited

U.S. PATENT DOCUMENTS

| | | | |
|---|---|---|---|
| 5,191,423 A | | 3/1993 | Yoshida |
| 5,315,392 A | * | 5/1994 | Ishikawa et al. ............... 725/56 |
| 5,512,955 A | * | 4/1996 | Toyoshima et al. ............ 725/56 |
| 5,844,633 A | * | 12/1998 | Kim ............................. 725/56 |
| 7,388,536 B2 | * | 6/2008 | Kim ........................... 341/176 |

| | | |
|---|---|---|
| 2001/0052124 A1 | 12/2001 | Kim et al. |
| 2003/0067557 A1 | 4/2003 | Seo |

FOREIGN PATENT DOCUMENTS

| | | |
|---|---|---|
| CN | 1411270 A | 4/2003 |
| JP | 2002-223396 A | 8/2002 |
| KR | 95-13207 A | 5/1995 |
| KR | 97-73012 A | 11/1997 |
| KR | 2002-0076597 A | 10/2002 |
| KR | 10-0380345 B1 | 4/2003 |
| KR | 10-0421877 B1 | 3/2004 |
| KR | 1020050022195 A | 7/2005 |

\* cited by examiner

*Primary Examiner*—Trang U Tran
(74) *Attorney, Agent, or Firm*—Sughrue Mion, PLLC (57) ABSTRACT

A video processing apparatus including a memory to store a plurality of character strings corresponding a plurality of channels in predetermined sequence, a display part to display the character string to be superposed on a picture of the corresponding channel, a signal receiver to receive a forward or backward change signal for the character string in accordance with selection of a user, and a channel selection controller to control the display part to display a character string previously or next to the character string of the channel being currently displayed such that the previous or next character string is superposed on the picture of the corresponding channel, when the signal receiver receives the forward or backward change signal for the character string. Thus, a user can easily and quickly select a desired channel from among a plurality of channels. Also, a user can select a desired channel through simple, convenient and small user interface.

25 Claims, 9 Drawing Sheets

| | | | | | | | |
|---|---|---|---|---|---|---|---|
| A B C | 15 | B B C | 36 | C B S | 6 | • • • | |
| A C E | 22 | BROADCAST | 42 | C-SPAN | 70 | • • • | |
| A E G | 2 | BOBOS | 31 | COON | 104 | • • • | |
| ⋮ | | ⋮ | | ⋮ | | ⋮ | |

(BACKWARD)←CHARACTER STRING GROUP CHANGE→(FORWARD)

(BACKWARD)←CHARACTER STRING CHANGE→(FORWARD)

| | | (BACKWARD)←CHANNEL NUMBER GROUP CHANGE→(FORWARD) | | | | | |
|---|---|---|---|---|---|---|---|
| ↑(FORWARD) | · · · | 11 | M-TV | 21 | T B N | 31 | N H K | · · · |
| | · · · | 12 | ### | 22 | A C E | 32 | % % % | · · · |
| ↓(BACKWARD)←CHANNEL NUMBER | · · · | 13 | OOO | 23 | S B C | 33 | & & & | · · · |

VIDEO PROCESSING APPARATUS

CROSS-REFERENCE TO RELATED APPLICATIONS

This application claims priority from Korean Patent Application No. 10-2005-0008835, filed on Jan. 31, 2005, in the Korean Intellectual Property Office, the disclosure of which is incorporated herein by reference in its entirety.

BACKGROUND OF THE INVENTION

1. Field of the Invention

The present invention relates to a video processing apparatus, and more particularly, to a video processing apparatus, which allows a user to easily and quickly select a desired channel among a plurality of channels.

2. Description of the Related Art

Recently, a video processing apparatus such as a television (TV) has been widely used to receive a broadcasting signal for digital TV broadcasting, cable TV broadcasting or the like, and process the received broadcasting signal to thereby output pictures and sounds.

Such a broadcasting system including the digital TV broadcasting, the cable TV broadcasting or the like provides a user with hundreds of channels. However, it is difficult for a user to select a desired channel from among hundreds of channels by referring to only a channel number.

Accordingly, there has been proposed a video processing apparatus for the digital TV broadcasting, which can receive an electric program guide (EPG) in addition to the broadcasting signal. Here, the EPG contains channel information about a channel name, a channel genre, etc. Therefore, this video processing apparatus displays a user interface while a user watches the TV, and allows a user to select a desired channel on the basis of the channel information about the channel name, the channel genre, etc. as well as a channel number given by the EPG.

However, the user interface of the conventional video processing apparatus is complicated and inconvenient because it requires a user to do many manipulations. Further, in the conventional video processing apparatus, the user interface occupies a relatively large area of a screen, thereby interrupting the view of a user.

SUMMARY OF THE INVENTION

Accordingly, it is an aspect of the present invention to provide a video processing apparatus, which can allow a user to easily and quickly select a desired channel from among a plurality of channels.

Another aspect of the present invention is to provide a video processing apparatus, which can allow a user to select a desired channel through a simple, convenient and small user interface.

Additional aspects of the invention will be set forth in part in the description which follows and, in part, will be obvious from the description, or may be learned by practice of the invention.

The foregoing and other aspects of the present invention are achieved by providing a video processing apparatus comprising a memory to store a plurality of character strings corresponding to a plurality of channels in a predetermined sequence, a display part to display the character string to be superposed on a picture of the corresponding channel, a signal receiver to receive a forward or backward change signal for the character string in accordance with a selection of a user, and a channel selection controller to control the display part to display a character string previously or next to the character string of the channel being currently displayed such that the previous or next character string is superposed on the picture of the corresponding channel, when the signal receiver receives the forward or backward change signal for the character string.

According to an aspect of the present invention, the plurality of character strings is sorted into two or more character string groups and stored in the memory in a predetermined sequence, the signal receiver further receives a forward or backward change signal for the character string group in accordance with a selection of a user, and the channel selection controller controls the display part to display a character string which belongs to the character string group previously or next to the character string group of the channel being currently displayed such that the previous or next character string is superposed on the picture of the corresponding channel, when the signal receiver receives the forward or backward change signal for the character string group.

According to an aspect of the present invention, the video processing apparatus further comprises a remote controller provided with at least two pair of keys, wherein the signal receiver receives the forward or backward change signal for the character string, the character string group and the character number group and receives the signal for increasing or decreasing the channel number in accordance with a key input of a user from the remote controller.

According to an aspect of the present invention, the pair of keys corresponding to the forward and backward change signals for the character string are arranged on the remote controller at upper and lower sides or left and right sides thereof alternately with the pair of keys either corresponding to the forward and backward change signals for the character string group or the channel number group or corresponding to the signal for increasing or decreasing the channel number.

According to an aspect of the present invention, the channel selection controller controls two pairs of character strings, which will be changed on the basis of the forward and backward change signals for the character string, and the forward and backward change signals for the character string group or the channel number group, or the signal for increasing or decreasing the channel number, is previously displayed on the display part at upper, lower, left and right sides of the character string of the current channel corresponding to the arrangement of the keys provided in the remote controller.

According to an aspect of the present invention, the memory further stores a plurality of channel numbers corresponding to the plurality of channels, and the plurality of character strings is stored in the memory in order of channel numbers, the display part further displays the channel number to be superposed on the picture of the corresponding channel, the signal receiver further receives a signal for increasing or decreasing the channel number in accordance with selection of a user, and the channel selection controller controls a previous or next channel number to the channel number of the current channel together with the corresponding character string to be displayed on the display part as being superposed on the picture of the corresponding channel when the signal receiver receives the signal for increasing or decreasing the channel number.

According to an aspect of the present invention, the plurality of channel numbers is sorted into two or more channel number groups and stored in the memory in a predetermined sequence, the signal receiver further receives a forward or backward change signal for the channel number group in accordance with a selection of a user, and the channel selection controller controls the display part to display a channel number previously or next to the channel number of the channel being currently displayed together with the corresponding character string such that the previous or next channel number is superposed on the picture of the corresponding channel, when the signal receiver receives the signal for increasing or decreasing the channel number.

According to an aspect of the present invention, the video processing apparatus further comprises a remote controller provided with a pair of keys, wherein the signal receiver receives the forward or backward change signal for the character string in accordance with a key input of a user from the remote controller.

According to an aspect of the present invention, the character string includes one or more letters, and is stored in the memory in an alphabetical sequence.

According to an aspect of the present invention, the character string includes one or more numerals, and is stored in the memory in an ascending or descending sequence.

BRIEF DESCRIPTION OF THE DRAWINGS

These and other aspects of the present invention will become apparent and more readily appreciated from the following description of exemplary embodiments, taken in conjunction with the accompany drawings of which.

DETAILED DESCRIPTION OF EXEMPLARY EMBODIMENTS

Reference will now be made in detail to exemplary embodiments of the present invention, examples of which are illustrated in the accompanying drawings, wherein like reference numerals refer to like elements throughout. The exemplary embodiments are described below so as to explain the present invention by referring to the figures.

Figure 1:
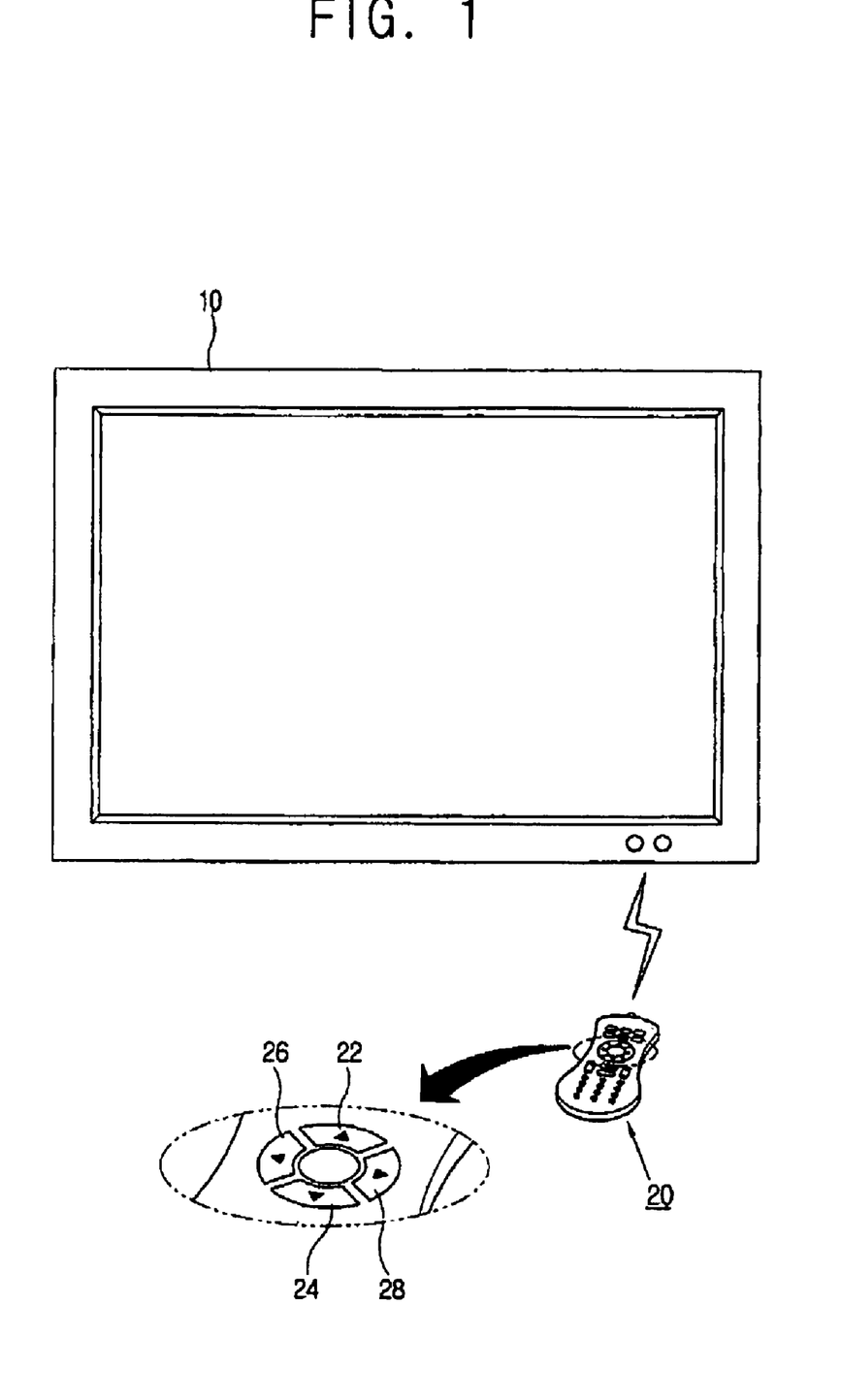
FIG. 1 is a perspective view of a video processing apparatus according to an exemplary embodiment of the present invention.

FIG. 1 is a perspective view of a video processing apparatus according to an exemplary embodiment of the present invention.

A video processing apparatus 10 according to an exemplary embodiment of the present invention receives a broadcasting signal from a predetermined broadcasting station, applies a predetermined process to the received broadcasting signal, and outputs pictures and sounds based on the processed signal.

According to an exemplary embodiment of the present invention, the video processing apparatus 10 may include a digital TV, which receives, processes and outputs the broadcasting signal through a plurality of channels. In this case, the broadcasting signal received by the video processing apparatus 10 can contain channel information about a channel name, a channel genre, a channel grade, etc. For example, this information can be provided through an EPG.

Further, the video processing apparatus 10 allows the channel name to be selected corresponding to a user's manipulation while outputting pictures and sounds according to a current channel, which will be referred to as "channel navigation" hereinafter. That is, the video processing apparatus 10 displays the channel name in the picture of the current channel, and allows a user to select the channel name in various manners.

The video processing apparatus 10 is provided with a predetermined input key panel (not shown) mounted to its main body to receive a user input. Alternatively, a remote controller 20 may be provided to receive a user input (refer to FIG. 1).

Figure 2:
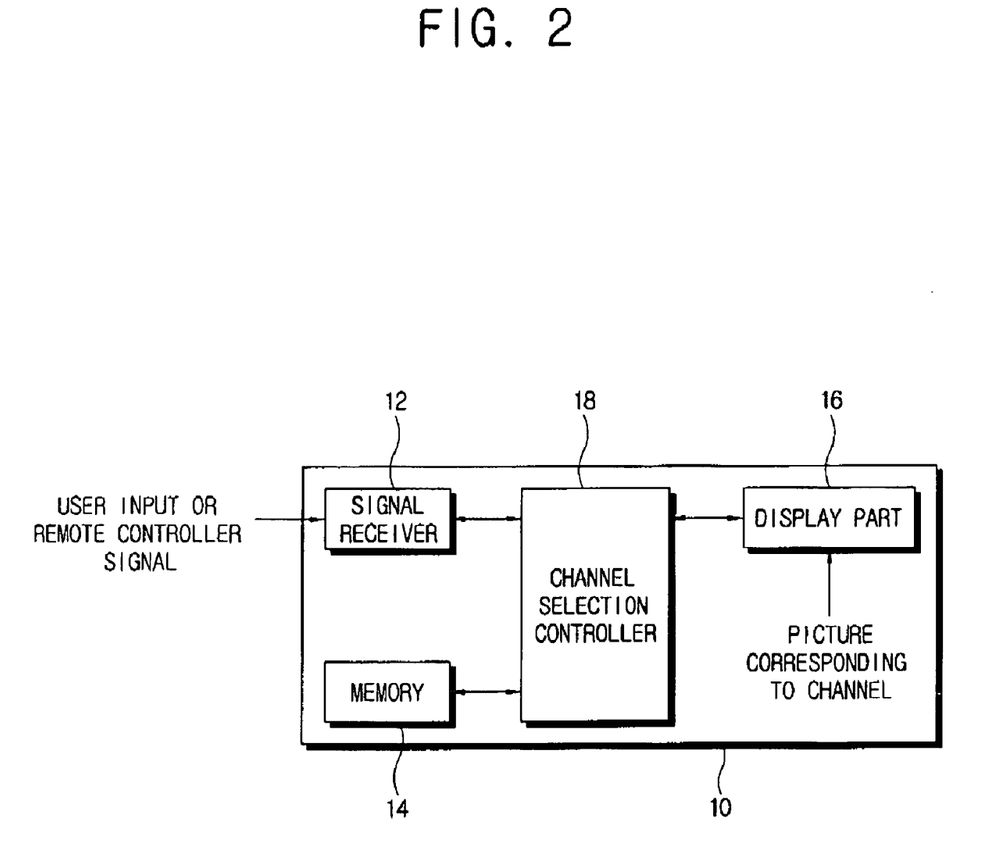
FIG. 2 is a control block diagram of a video processing apparatus according to an exemplary embodiment of the present invention.

FIG. 2 is a control block diagram of a video processing apparatus according to an exemplary embodiment of the present invention. As shown therein, the video processing apparatus 10 according to an exemplary embodiment of the present invention comprises a signal receiver 12, a memory 14, a display part 16, and a channel selection controller 18.

Through the signal receiver 12, a forward or backward change signal for a character string is transmitted from the input key panel or the remote controller 20 to the channel selection controller 18.

According to an exemplary embodiment of the present invention, the character string is a combination of one or more characters designating the channel name. For example, the character includes letter, numeral, Hankul, etc. Alternatively, the character string may designate other channel characteristics such as a channel genre, a channel grade, or the like as well as the channel name.

When the signal receiver 12 receives the forward or backward change signal for a character string from the remote controller 20, the signal receiver 12 may perform a predetermined signal process to convert the received signal into a signal suitable for the channel selection controller 18.

According to an exemplary embodiment of the present invention, the memory 14 stores a plurality of character strings each corresponding to the plurality of channels in a predetermined order. Such a character string may be included in the broadcasting signal received by the video processing apparatus 10. In this exemplary embodiment, the character string for designating the channel name is stored in the memory 14 corresponding to the channel number.

Figure 4:
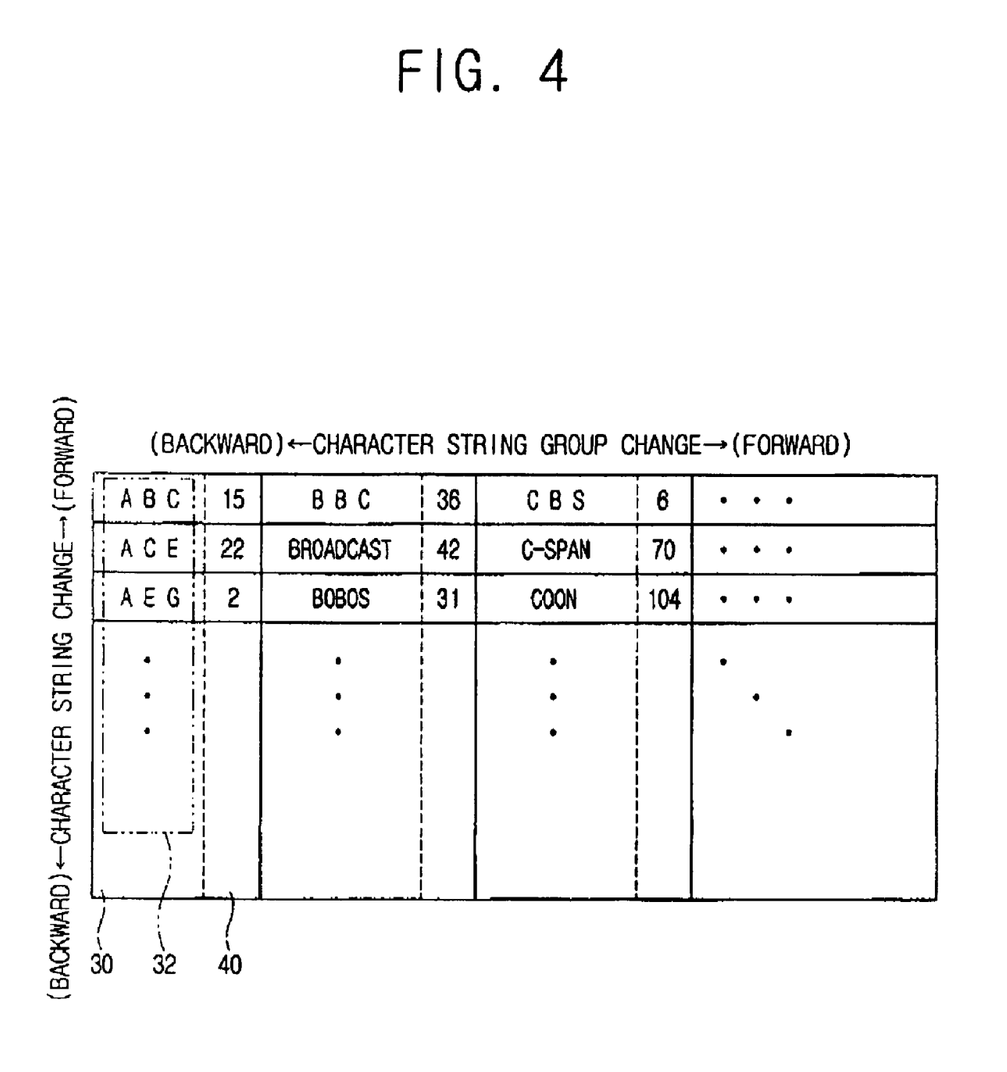
FIG. 4 shows a table containing a list of a character string and a character string group, which is stored in a memory, according to an exemplary embodiment of the present invention.

Further, in this exemplary embodiment, each character string includes the letters designating the channel name. In this case, the character strings are sorted in an alphabetical sequence and stored in the memory 14. Alternatively, the character strings may include the numerals designating a part of or the entire channel name itself. In this case, the numerals are sorted in ascending or descending sequence and stored in the memory 14. FIG. 4 shows a table containing a list of the character strings stored in the memory 14.

Figure 3:
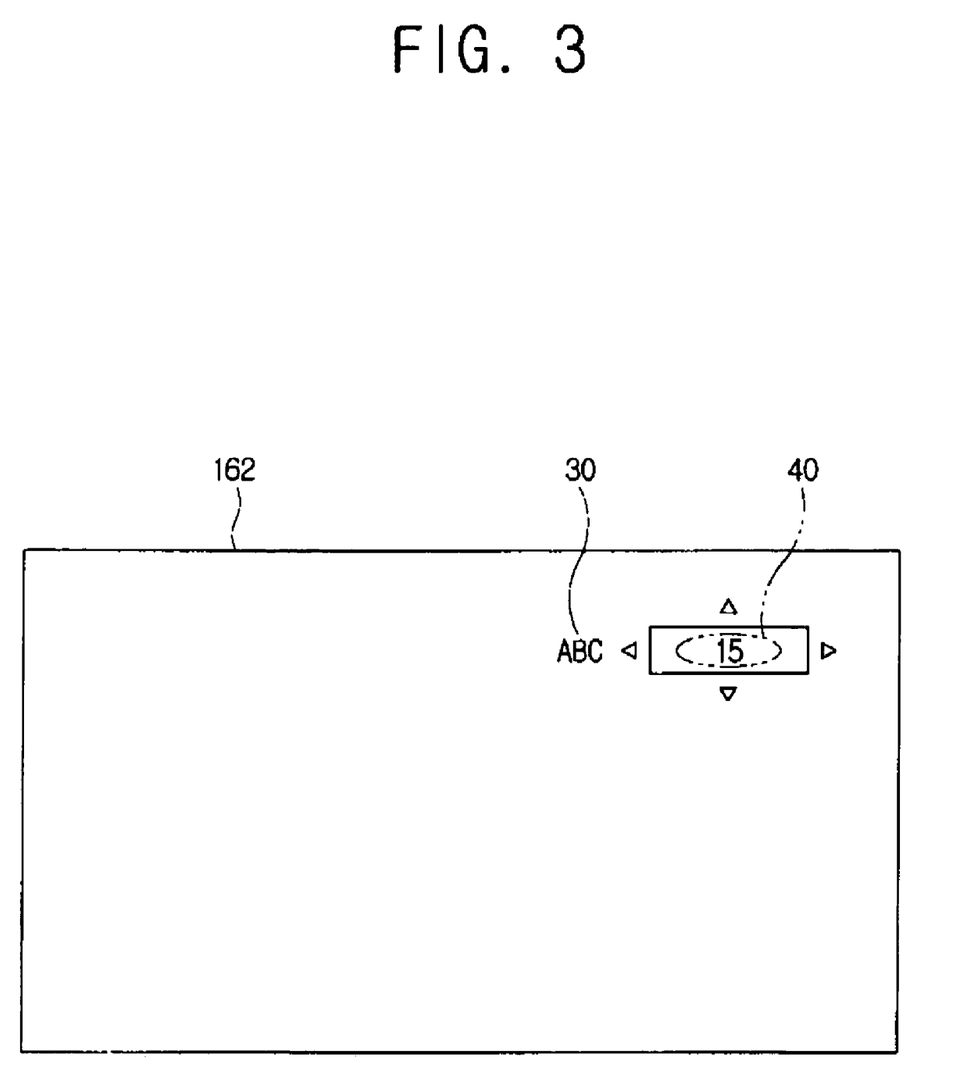
FIG. 3 shows a user interface with a character string according to an exemplary embodiment of the present invention.

The display part 16 is controlled by the channel selection controller 18 to display the character string 30 being superposed on a picture of a corresponding channel. For example, the display part 16 may comprise a cathode ray tube (CRT) or a liquid crystal display (LCD). As shown in FIG. 3, the display part 16 displays a picture based on the processed broadcasting signal onto a screen 162, and at the same time displays the character string 30 designating the channel name at a predetermined location of the screen 162.

The channel selection controller 18 checks whether the signal receiver 12 receives the change signal for the character string 30 from the input key panel or the remote controller 20, and changes the character string 30 displayed on the display part 16 according to the received signals, thereby allowing a user to select the channel name.

According to an exemplary embodiment of the present invention, the channel selection controller 18 determines whether the forward change signal or the backward change signal for the character string 30 is transmitted from the input key panel or the remote controller 20 to the signal receiver 12. The channel selection controller 18 compares the frequency of the signal received by the signal receiver 12 with a predetermined reference frequency, and determines the received signal as the forward change signal or the backward change signal for the character string 30 when the frequency of the received signal is equal to the reference frequency.

Here, a forward change of the character string 30 means that at least one of the letters included in the character string 30 designating the channel name is changed as shown in FIG. 4, and a backward change of the character string 30 means the forward change is reversed.

The remote controller 20 comprises at least one pair of keys, so that the forward change signal or the backward change signal for the character string 30 is transmitted according to a user's inputs. As shown in FIG. 1, one pair of keys may be provided as upper and lower keys 22 and 24 of the remote controller 20 corresponding to the forward change signal or the backward change signal for the character string 30. Alternatively, one pair of keys may be provided as left and right keys 26 and 28 of the remote controller 20 corresponding to the forward change signal or the backward change signal for the character string 30.

In this exemplary embodiment, the lower key 24 corresponds to the forward change signal for the character string 30, and the upper key 22 corresponds to the backward change signal for the character string 30. Alternatively, the upper key 22 may correspond to the forward change signal for the character string 30, and the lower key 24 may correspond to the backward change signal for the character string 30. Here, the remote controller 20 generates the signals having different frequencies according to one pair of keys 22 and 24.

Figure 5:
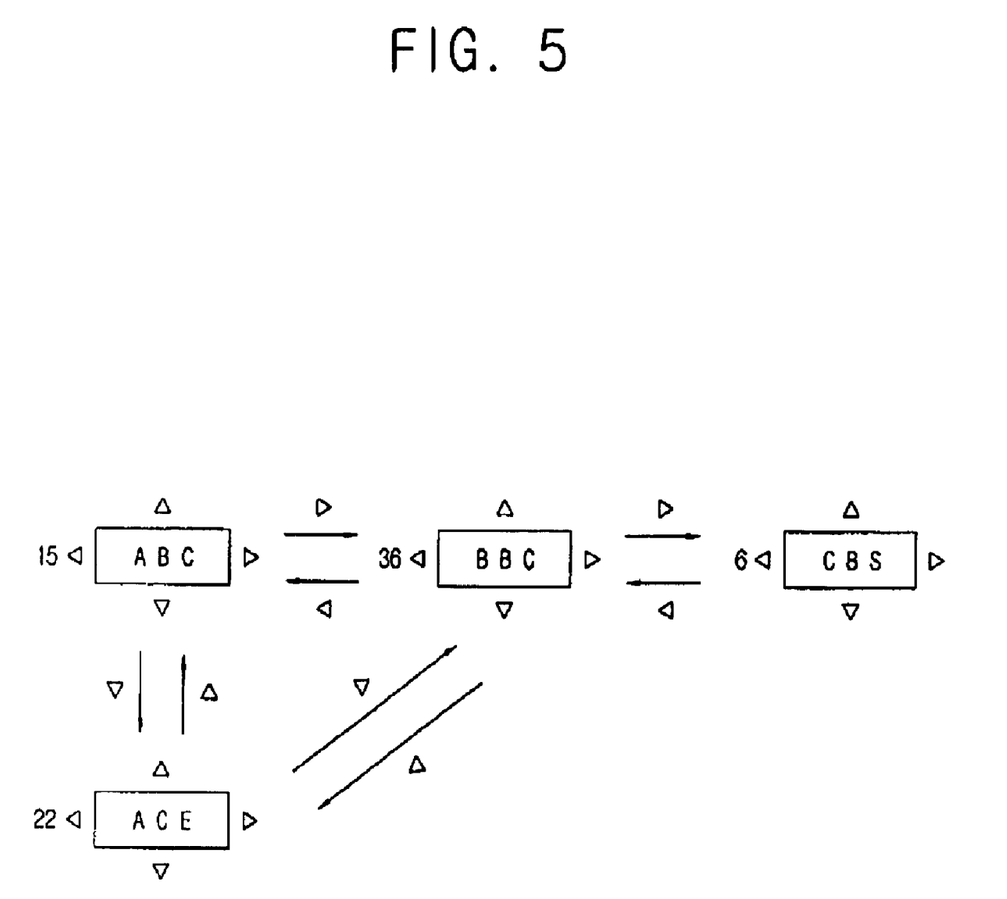
FIG. 5 illustrates that the character string and the character string group are changed according to an exemplary embodiment of the present invention.

Referring to FIG. 5, operations of the channel selection controller 18 to change the character string 30 will be described hereinbelow. The channel section controller 18 checks a current channel when the signal receiver 12 receives the signal having a predetermined frequency from the remote controller 20 according to a key input, i.e., when the signal receiver 12 receives the signal corresponding to the upper key 22 of the remote controller 20, and controls the screen 162 to display the character string 30 designating the channel name of the current channel 40, which is read out from the memory 14, to be superposed on a picture of the corresponding channel. Further, the channel selection controller 18 may control the screen 162 to display a channel number 40 at a location adjacent to the character string 30 as well as the character string 30 designating the channel name.

For example, as shown in FIG. 5, when the current channel 40 has a channel number of "15", the channel selection controller 18 controls the screen 162 to display a character string of "ABC" as a channel name corresponding to the channel number of "15" together with the channel name of "15".

In the state that the current channel has the channel name "ABC", when the channel selection controller 18 receives the forward change signal for the character string 30 from the remote controller 20 in correspondence with the lower key 24, the channel selection controller 18 controls the screen 162 of the display part 16 to display thereon a character string of "ACE", which is forwardly changed from the current character string of "ABC" with reference to the memory 14, together with a channel number of "22" corresponding to the changed character string of "ACE". At this time, the character string of "ACE" and the character number of "22" are superposed on a picture of the corresponding channel.

On the other hand, in the state that the current channel has the channel name "ACE", when the channel selection controller 18 receives the backward change signal for the character string 30 from the remote controller 20 in correspondence with the upper key 22, the channel selection controller 18 controls the screen 162 of the display part 16 to display thereon the character string of "ABC", which is backwardly changed from the current character string of "ACE" with reference to the memory 14, together with a channel number of "15" corresponding to the changed character string of "ABC". At this time, the character string of "ABC" and the character number of "15" are superposed on a picture of the corresponding channel.

Thus, the video processing apparatus 10 according to an exemplary embodiment of the present invention determines whether a signal transmitted from the remote controller 20 to the signal receiver 12 is the forward change signal or the backward change signal, and controls the character string 30 designating the channel name of the current channel to be correspondingly changed and displayed. Therefore, even though a user does not know a channel number of a desired channel from among a number of channels provided by the digital TV broadcasting, the cable TV broadcasting or the like, a user can easily select a desired channel using the channel name.

Preferably, the channel selection controller 18 displays the character string 30 to be as small as possible to minimize the size of the character string 30 to be superposed on a picture of a corresponding channel as long as a user can distinguish the character strings 30. Further, the channel section controller 18 displays the character string 30 to be located at one corner of the screen 162, thereby preventing a picture of the corresponding channel 40 from being interrupted by the character string 30.

As compared with a conventional user interface for the channel navigation, which is complicated and occupies most of the screen 162, a user interface according to an exemplary embodiment of the present invention provides a simple and small user interface, thereby allowing a user to easily select the channel, and minimizing the picture interruption due to the channel selection.

Meanwhile, the plurality of character strings 30 is sorted into two or more character string groups 32 and stored in the memory 14 in a predetermined sequence. In this exemplary embodiment, the character strings groups 32 are grouped with respect to the same leftmost one of the letters forming the character string 30 for designating the channel name. Further, the character string groups 32 are stored in the memory 14 in an alphabetical sequence of their leftmost letters.

Here, the remote controller 20 further comprises at least one pair of keys, and transmits a forward or backward change signal for the character string group 32 according to a user's key inputs. As shown in FIG. 1, one pair of keys may be provided as left and right keys 26 and 28 of the remote controller 20 corresponding to the forward change signal or the backward change signal for the character string group 32. Alternatively, one pair of keys may be provided as upper and lower keys 22 and 24 of the remote controller 20 corresponding to the forward change signal or the backward change signal for the character string group 32.

In this exemplary embodiment, the right key 28 corresponds to the forward change signal for the character string group 32, and the left key 26 corresponds to the backward change signal for the character string group 32. Alternatively, the left key 26 may correspond to the forward change signal for the character string group 32, and the right key 28 may correspond to the backward change signal for the character string group 32. Here, the remote controller 20 generates the signals having different frequencies according to one pair of keys 26 and 28.

Here, the channel selection controller 18 determines whether the signal receiver 12 receives the forward change signal or the backward change signal for the character string group 32 from the remote controller 20. The channel selection controller 18 compares the frequency of the signal received by the signal receiver 12 with a predetermined reference frequency, and determines that the received signal is either of the forward or backward change signals for the character string group 32 when the frequency of the received signal is equal to the reference frequency.

Here, a forward change of the character string group 32 means that the leftmost one of the plurality of letters as the character string group 32 is changed in alphabetical sequence, and a backward change of the character string group 32 means the forward change is reversed.

Referring to FIG. 5, operations of the channel selection controller 18 to change the character string group 32 will be described hereinbelow. The channel section controller 18 checks a current channel when the signal receiver 12 receives the signal having a predetermined frequency from the remote controller 20 according to a key input, i.e., when the signal receiver 12 receives the signal corresponding to the lower key 24 of the remote controller 20, and controls the screen 162 to display the character string 30 designating the channel name of the current channel 40, which is read out from the memory 14, to be superposed on a picture of the corresponding channel together with the channel number 40.

For example, as shown in FIG. 5, when the current channel 40 has a channel number of "15", the channel selection controller 18 controls the screen 162 of the display part 16 to display a character string of "ABC" as a channel name corresponding to the channel number of "15" together with the channel name of "15".

In the state that the current channel has the channel name of "ABC", when the channel selection controller 18 receives the forward change signal for the character string group 32 from the remote controller 20 in correspondence with the input of the right key 28, the channel selection controller 18 controls the screen 162 of the display part 16 to display thereon a character string of "BBC", which belongs to the character string group forwardly changed from the current character string group 32 including the character string of "ABC" with reference to the memory 14, together with a channel number of "36" corresponding to the changed character string of "BBC". At this time, the character string of "BBC" and the corresponding character number of "36" are superposed on a picture of the corresponding channel.

On the other hand, in the state that the current channel has the channel name "BBC", when the channel selection controller 18 receives the backward change signal for the character string group 32 from the remote controller 20 in correspondence with the left key 26, the channel selection controller 18 controls the screen 162 of the display part 16 to display thereon the character string of "ABC", which belongs to the character string group backwardly changed from the character string group including the current character string of "BBC" with reference to the memory 14, together with a channel number of "15" corresponding to the changed character string of "ABC". At this time, the character string of "ABC" and the character number of "15" are superposed on a picture of the corresponding channel.

Likewise, in the state that the current channel has the channel name of "BBC", when the channel selection controller 18 receives the forward change signal for the character string group 32 from the remote controller 20, the channel selection controller 18 controls the screen 162 to display a character string of "CBS" thereon. Further, in the state that the current channel has the channel name of "ACE", when the channel selection controller 18 receives the forward change signal for the character string group 32 from the remote controller 20, the channel selection controller 18 controls the screen 162 to display a character string of "BBC" thereon. In the latter case, the channel selection controller 18 controls the screen 162 to display the first character string of "BBC" that belongs to the next character string group to the character string group including the character string of "ACE". However, the channel selection controller 18 may control the screen 162 to alternatively display the second character string of "BROADCAST" among the character string included in the next character string group, if necessary.

Thus, the video processing apparatus 10 according to an exemplary embodiment of the present invention determines whether a signal transmitted from the remote controller 20 to the signal receiver 12 is the forward change signal or the backward change signal for the character string 30 and the character string group 32, and controls the character string 30 designating the channel name of the current channel to be correspondingly changed and displayed. Therefore, even though a user does not know a channel number of a desired channel from among a number of channels provided by the digital TV broadcasting, the cable TV broadcasting or the like, a user can easily and quickly select a desired channel through a minimal operation of keys.

Figure 6:
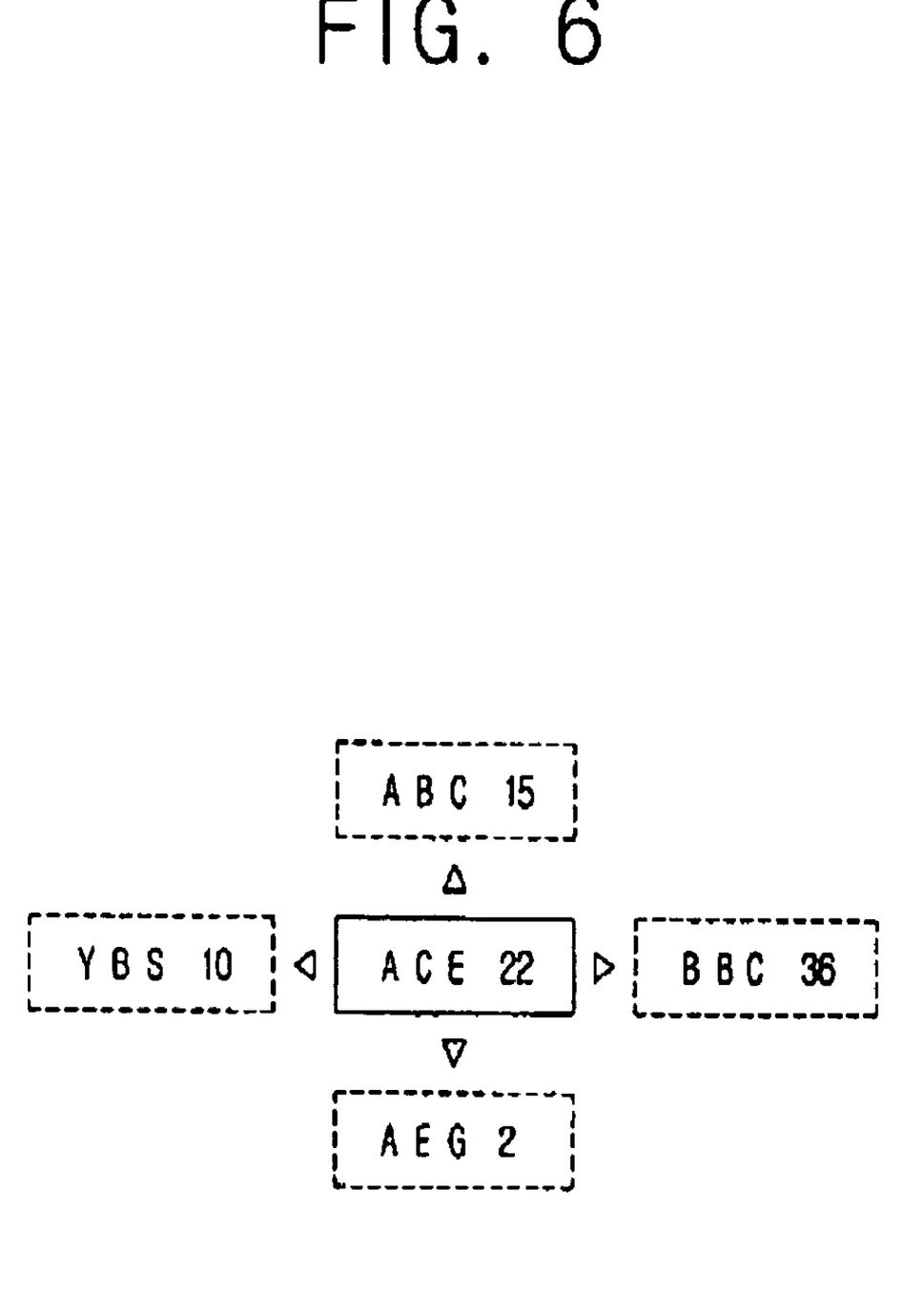
FIG. 6 shows a user interface with a character string according to another exemplary embodiment of the present invention.

Further, the channel selection controller 18 can control the character string, which is obtained by changing the character string 30 or the character string group 32 forwardly or backwardly, to be displayed in addition to the character string 30 corresponding to the current channel. In this case, the channel selection controller 18 controls the forwardly or backwardly changed character string to be displayed at upper, lower, left and right sides of the current channel character string 30 in correspondence with the key arrangement of the remote controller 20.

For example, in the case where the character string of "ACE" is selected as the channel name of the current channel, the channel selection controller 18 controls the character strings of "AEG", "ABC", "BBC" and "YBS", which can be obtained by forwardly or backwardly changing the character string of "ACE" and the character string group including the character string of "ACE", to be displayed at the lower, upper, right and left sides of the current channel character string 30, respectively.

Therefore, the video processing apparatus 10 according to an exemplary embodiment of the present invention lets a user know the channel name to be changed by the key input as well as the channel name of the current channel, thereby allowing a user to easily select the channel.

Figure 7:
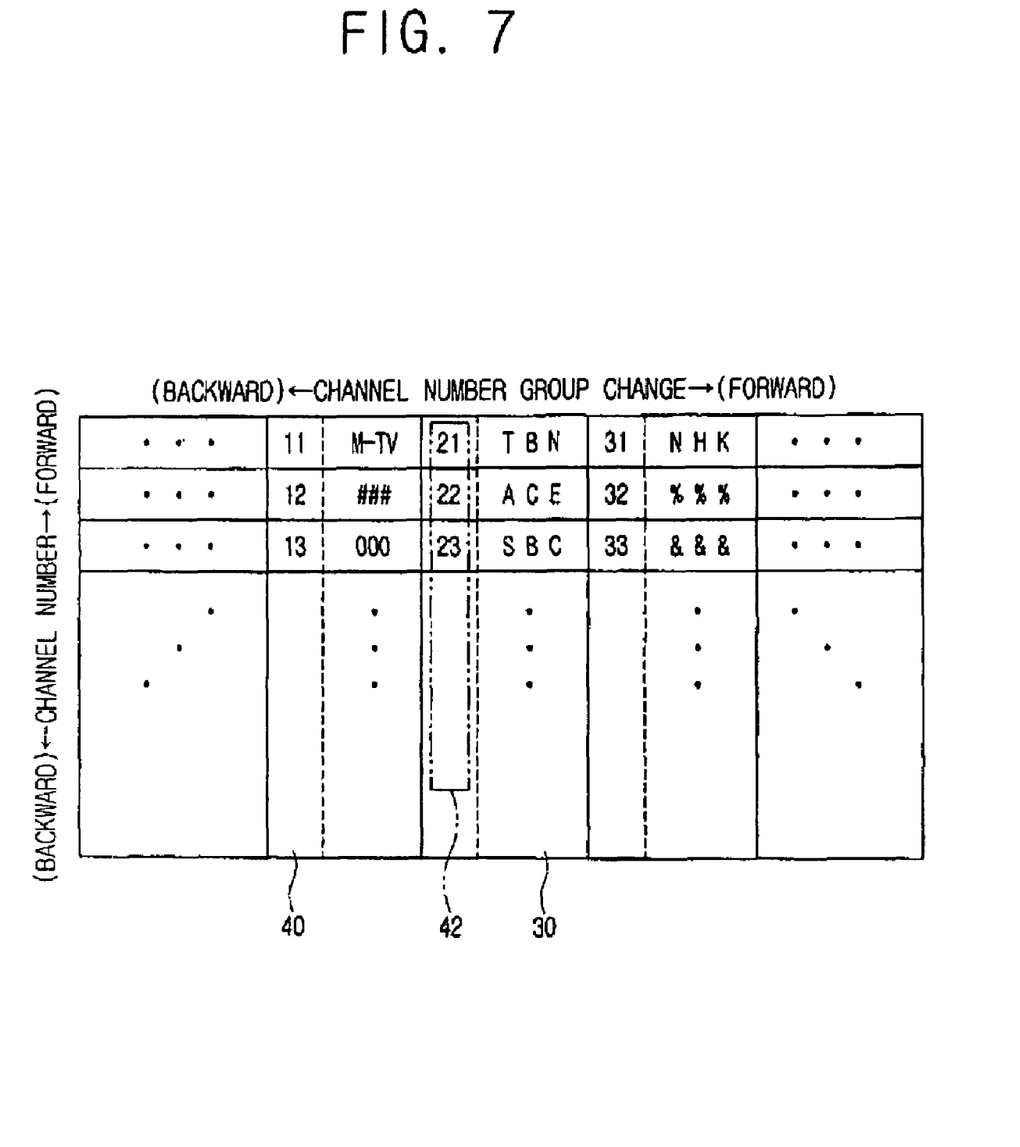
FIG. 7 shows a table containing a list of a character string, a channel number and a channel number group, which is stored in a memory, according to another exemplary embodiment of the present invention.

In the meantime, the memory 14 stores the plurality of character strings 30 designating the channel names in numerical sequence of the channel number, which is tabulated in FIG. 7.

According to an exemplary embodiment of the present invention, the remote controller 20 transmits a signal for increasing or decreasing the channel number 40 according to a user's key inputs through a predetermined one pair of keys. The pair of keys provided in the remote controller 20 corresponding to the increment or the decrement of the channel number 40 may be the same as the pair of keys corresponding to the forward or backward change signal for the character string 30 or the character string group 32.

In this exemplary embodiment, the pair of keys provided in the remote controller 20 corresponding to the signal for increasing or decreasing the channel number 40 is set as the left and right keys 26 and 28 (refer to FIG. 1). Alternatively, the pair of keys corresponding to the signal for increasing or decreasing the channel number 40 may be set as the upper and lower keys 22 and 24.

For example, the right key 28 corresponds to the signal for increasing the channel number 40, and the left key 26 corresponds to the signal for decreasing the channel number 40. Alternatively, the right key 28 may correspond to the signal for decreasing the channel number 40, and the left key 26 may correspond to the signal for increasing the channel number 40.

The channel selection controller 18 determines whether the signal receiver 12 receives the signal for increasing or decreasing the channel number 40 from the remote controller 20. The channel selection controller 18 compares the frequency of the signal received by the signal receiver 12 with a predetermined reference frequency, and determines the received signal as the signal for increasing or decreasing the channel number 40 when the frequency of the received signal is equal to the reference frequency.

The channel section controller 18 checks whether the signal receiver 12 receives the signal having a predetermined frequency from the remote controller 20 through a predetermined key input. For example, the channel selection controller 18 checks a current channel when the signal receiver 12 receives the signal corresponding to the left key 26 of the remote controller 20, and controls the screen 162 of the display part 16 to display the character string 30 designating the channel name of the current channel 40, which is read out from the memory 14, to be superposed on a picture of the corresponding channel together with the channel number 40.

While the channel is selected in the character string groups 32 through inputs of the left key 26, the channel selection controller 18 performs the foregoing operation when receiving a different key having a predetermined frequency from the remote controller 20.

Figure 8:
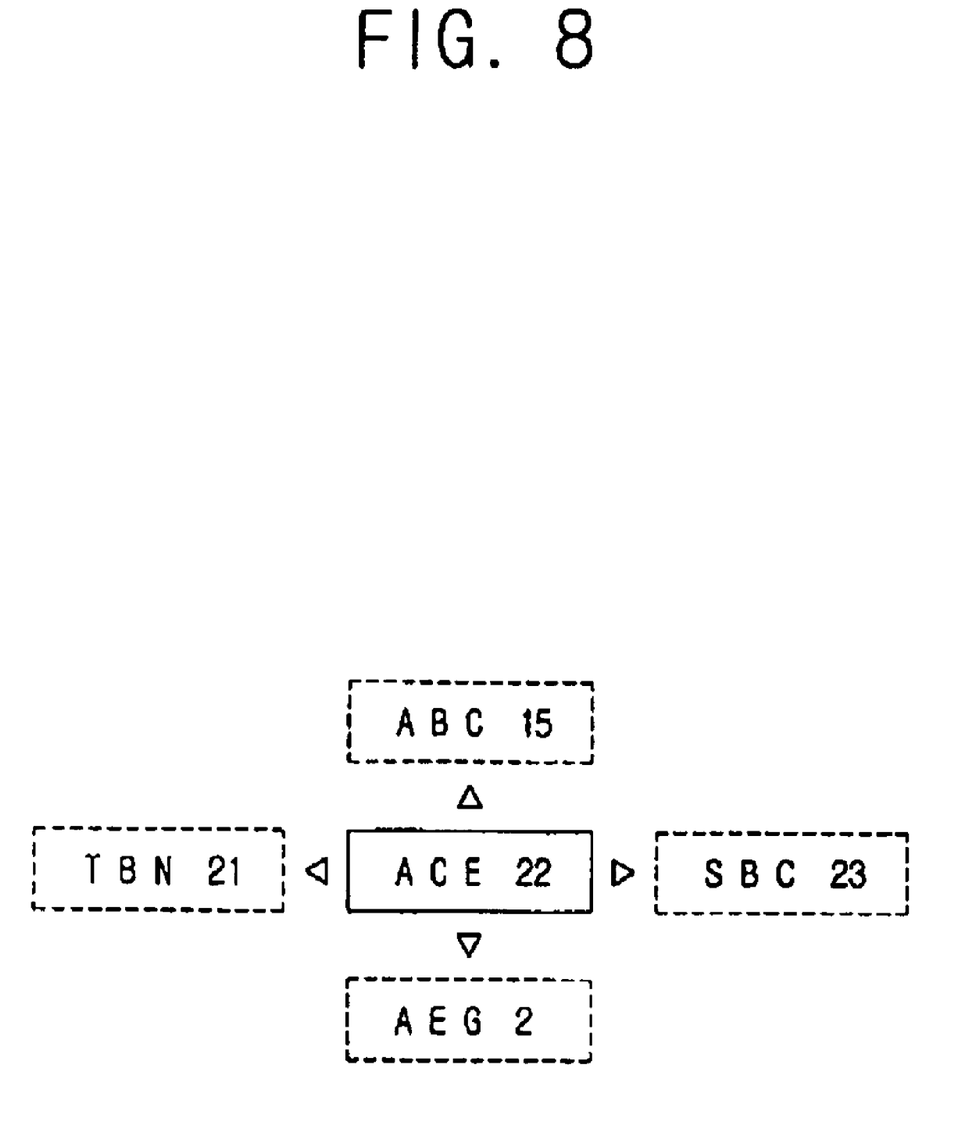
FIGS. 8 and 9 show a user interface with a character string according to still another exemplary embodiment of the present invention.

For example, referring to FIG. 8, when the current channel 40 has a channel number of "22", the channel selection controller 18 controls the screen 162 of the display part 16 to display the channel number of "22" and a corresponding character string of "ACE". In this case, the channel selection controller 18 can control the character strings of "AEG 2", "ABC 15", "SBC 23" and "TBN 21", which can be obtained by the signal for increasing and decreasing the channel number 40 or the signal for forwardly or backwardly changing the character string of "ACE", to be previously displayed at the lower, upper, right and left sides of both the current channel number and the corresponding channel character string 30, respectively.

In the state that the current channel has the channel name and the channel number of "ACE 22", when the channel selection controller 18 receives the signal for increasing the channel number 40 from the remote controller 20 in correspondence with the input of the right key 28, the channel selection controller 18 controls the current channel name and the current channel number of "ACE 22" to be replaced with the next character string and the next channel number of "SBC 23". Further, the channel selection controller 18 controls the character strings and the character numbers, which will be changed from the changed character string and the changed channel name on the basis of both the forward and backward change signals and the channel number increasing and decreasing signals, to be displayed at upper, lower, left and right sides of the changed character string and the changed channel number of "SBC 23" with reference to the memory 14.

On the other hand, in the state that the current channel has the channel name and the channel number of "ACE 22", when the channel selection controller 18 receives the signal for decreasing the channel number 40 from the remote controller 20 in correspondence with the input of the left key 26, the channel selection controller 18 controls the current channel name and the current channel number of "ACE 22" to be replaced with the previous character string and the previous channel number of "TBN 21". Further, the channel selection controller 18 controls the character strings and the character numbers, which will be changed from the changed character string and the changed channel name on the basis of both the forward and backward change signals and the channel number increasing and decreasing signals, to be displayed at the upper, lower, left and right sides of the changed character string and the changed channel number of "TBN 21" with reference to the memory 14.

Further, in the state that the current channel has the channel name and the channel number of "ACE 22", even though the channel selection controller 18 receives the forward or backward change signal for only the character string 30 without the channel number increasing or decreasing signal the from the remote controller 20, the channel selection controller 18 controls both the corresponding character string 30 and the corresponding channel number 40 to be displayed at a corresponding location of the display part 16 with reference to the memory 14.

Thus, the video processing apparatus 10 according to an exemplary embodiment of the present invention allows a user to easily select the channel by using the channel number as well as the channel name. That is, various manners are provided for allowing a user to select the channel.

In the meanwhile, the plurality of character string 30 designating the channel names is sorted into two or more channel number groups and stored in memory 14. The character strings 30 sorted into the channel number groups are tabulated in FIG. 7. In this exemplary embodiment, the plurality of character strings 30 is sorted into the channel number groups 42 by a double digit. Alternatively, the plurality of character strings 30 is sorted into the channel number groups 42 by a triple digit.

According to an exemplary embodiment of the present invention, the remote controller 20 transmits forward or backward change signals for the channel number group 42 according to a user's key inputs through a predetermined one pair of keys. The pair of keys provided in the remote controller 20 corresponding to the forward or backward change signals for the channel number groups 42 may be the same as the pair of keys corresponding to the forward or backward change signal for the character string 30 or the character string group 32.

In this exemplary embodiment, the pair of keys provided in the remote controller 20 corresponding to the forward and backward change signals for the channel number groups 42 is set as the left and right keys 26 and 28 (refer to FIG. 1). Alternatively, the pair of keys corresponding to the forward and backward change signals for the channel number groups 42 may be set as the upper and lower keys 22 and 24.

For example, the right key 28 corresponds to the forward change signal for the channel number group 42, and the left key 26 corresponds to the backward change signal for channel number group 42. Alternatively, the right key 28 may correspond to the backward change signal for the channel number group 42, and the left key 26 may correspond to the forward change signal for the channel number group 42.

The channel selection controller 18 determines whether the signal receiver 12 receives the forward or backward change signal for the channel number group 42 from the remote controller 20. The channel selection controller 18 compares the frequency of the signal received by the signal receiver 12 with a predetermined reference frequency, and determines the received signal as the forward or backward change signal for the channel number 40 when the frequency of the received signal is equal to the reference frequency.

The channel section controller 18 checks whether the signal receiver 12 receives the signal having a predetermined frequency from the remote controller 20 through a predetermined key input. For example, the channel selection controller 18 checks a current channel when the signal receiver 12 receives the signal corresponding to the right key 28 of the remote controller 20, and controls the screen 162 of the display part 16 to display the character string 30 designating the channel name of the current channel, which is read out from the memory 14, to be superposed on a picture of the corresponding channel together with the channel number 40 of the current channel.

While the channel is selected in the character string groups 32 through inputs of a key such as key 26, the channel selection controller 18 performs the foregoing operation when receiving a different key having a predetermined frequency from the remote controller 20.

Figure 9:
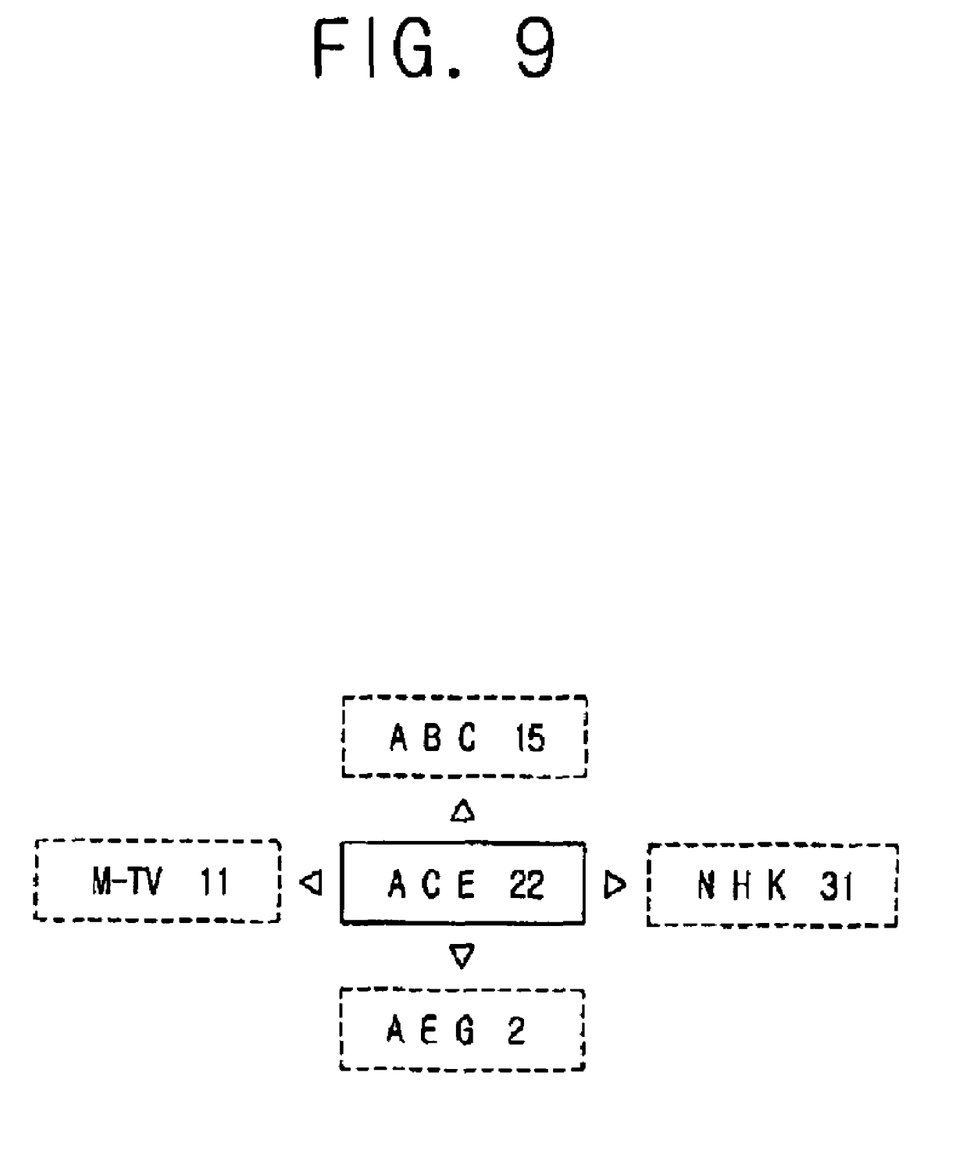

For example, as shown in FIG. 9, when the current channel has a channel number of "22", the channel selection controller 18 controls the screen 162 of the display part 16 to display the channel number of "22" and a corresponding character string of "ACE". In this case, the channel selection controller 18 can control the character strings of "AEG 2", "ABC 15", "NHK 31" and "M-TV 11", which can be obtained by changing the character string 30 and the channel number group 42 on the basis of the forward and backward change signals, to be previously displayed at the lower, upper, right and left sides of both the current channel number group 42 and the corresponding channel character string 30, respectively.

In the state that the current channel has the channel name and the channel number of "ACE 22", when the channel selection controller 18 receives the forward change signal for the channel number group 42 from the remote controller 20 in correspondence with the input of the right key 28, the channel selection controller 18 controls the current channel name and the current channel number to be replaced with both the channel number that belongs to the next channel number group and the corresponding character string of "NHK 31", and further controls the character strings and the character numbers, which will be changed from the changed character string and the changed channel name on the basis of both the forward and backward change signals for the character string 30 and the channel number group 42, to be displayed at upper, lower, left and right sides of the changed character string and the changed channel number of "NHK 31" with reference to the memory 14.

On the other hand, in the state that the current channel has the channel name and the channel number of "ACE 22", when the channel selection controller 18 receives the backward change signal for the channel number group 42 from the remote controller 20 in correspondence with the input of the left key 26, the channel selection controller 18 controls the current channel name and the current channel number to be replaced with both the channel number that belongs to the previous channel number group and the corresponding character string of "M-TV 11", and further controls the character strings and the character numbers, which will be changed from the changed character string and the changed channel name on the basis of both the forward and backward change signals for the character string 30 and the channel number group 42, to be displayed at upper, lower, left and right sides of the changed character string and the changed channel number of "M-TV 11" with reference to the memory 14.

Further, in the state that the current channel has the channel name and the channel number of "ACE 22", even though the channel selection controller 18 receives the forward or backward change signal for only the character string 30 without the forward or backward change signal for the channel number groups 42 from the remote controller 20, the channel selection controller 18 controls both the corresponding character string 30 and the corresponding channel number 40 to be displayed at a corresponding location of the display part 16 with reference to the memory 14.

Thus, the video processing apparatus 10 according to an exemplary embodiment of the present invention allows a user to easily select the channel by using the channel number group as well as the channel name. That is, various manners are provided for allowing a user to easily and quickly select the channel from among a number of channels.

Here, the channel selection controller 18 can be programmed as software suitable for a predetermined general processor to perform the channel navigation, which is stored in a predetermined memory, e.g., a read only memory (ROM) and operated by the general processor.

Further, the keys provided in the remote controller corresponding to the change signals for the character strings, the character string groups, the channel numbers and the channel number groups are not limited to two pair of keys. Alternatively, three or four pairs of keys may be provided. Further, the arrangements of these keys are not limited to upper, lower, left and right places of the remote controller. Alternatively, the arrangements of these keys may be shaped like "X". In this case, it is preferable that the character string and the character number displayed in the user interface correspond to the arrangements of the key.

As described above, exemplary embodiments of the present invention provide a video processing apparatus allowing a user to easily and quickly select a desired channel from among a plurality of channels.

Particularly, even though a user does not know a channel number of a desired channel, a user can easily select the desired channel by using the channel name. Thus, a user can easily and quickly select a desired channel from among the plurality of channels.

Further, a desired channel can be selected in various manners through the channel name and the channel number. Thus, a desired channel is easily and quickly selected while it is selected using the channel name and the channel number.

Also, a video processing apparatus according to an exemplary embodiment of the present invention provides a user with a simple user interface, thereby allowing a user to conveniently select the channel name. Further, the user interface has a small size, thereby minimizing a picture interruption due to the channel selection.

Further, a video processing apparatus according to an exemplary embodiment of the present invention provides a user with a user interface corresponding to the arrangements of operation keys, thereby allowing a user to conveniently select the channel name. Also, a channel name and a channel number, which will be changed, are previously displayed, thereby allowing a user to easily select a desired channel name and a desired channel number.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A video processing apparatus comprising:
   a memory which stores a plurality of character strings corresponding to a plurality of channels in a predetermined sequence;
   a display part which displays a character string to be superposed on a picture of a corresponding channel;
   a signal receiver which receives a forward or backward change signal for the character string in accordance with a selection of a user; and
   a channel selection controller which controls the display part to display a character string previously or next to the character string of the channel being currently displayed such that a previous or next character string is superposed on the picture of the corresponding channel, when the signal receiver receives the forward or backward change signal for the character string,
   wherein the character string includes one or more letters, and is stored in the memory in alphabetical sequence.

2. The video processing apparatus according to claim 1, wherein the plurality of character strings is sorted into two or more character string groups and stored in the memory in a predetermined sequence;
   the signal receiver further receives a forward or backward change signal for a character string group in accordance with a selection of a user; and
   the channel selection controller controls the display part to display a character string which belongs to a character string group previously or next to the character string group of the channel being currently displayed such that the previous or next character string is superposed on the picture of the corresponding channel, when the signal receiver receives the forward or backward change signal for the character string group.

3. The video processing apparatus according to claim 1, further comprising a remote controller provided with a pair of keys,
   wherein the signal receiver receives the forward or backward change signal for the character string in accordance with a key input of the user from the remote controller.

4. The video processing apparatus according to claim 1, wherein the character string includes one or more numerals, and is stored in the memory in an ascending or descending sequence.

5. The video processing apparatus according to claim 1, wherein the channel selection controller controls the display part to display the character string previously or next to the character string of the channel being currently displayed, based on an alphabetical order of the stored plurality of character strings.

6. The video processing apparatus according to claim 1, wherein the plurality of character strings is sorted into a first character string group and a second character string group, the first character string group representing channel names which correspond to the plurality of channels and are stored in the memory by alphabetical order, and
   wherein the channel selection controller controls the display part to display a character string, belonging to the first character string group, which is alphabetically previously or next to the character string of the channel being currently displayed, accordingly to the alphabetical order of the stored first character string group, when the signal receiver receives the forward or backward change signal.

7. The video processing apparatus according to claim 6, wherein a first character of each character string of the first character string group is a same character.

8. The video processing apparatus according to claim 6, wherein adjacent character strings of the first character string group are arranged such that a first character of respective ones of the adjacent character strings are alphabetically sequential.

9. The video processing apparatus according to claim 6, wherein the second character string group represents channel numbers which correspond to the plurality of channels and are stored in the memory by numerical order, and
   wherein the channel selection controller controls the display part to display a character string, belonging to the second character string group, which is numerically previously or next to the character string of the channel being currently displayed, accordingly to the numerical order of the stored second character string group, when the signal receiver receives a second forward or backward change signal.

10. The video processing apparatus according to claim 6, wherein the second character string group represents channel names which correspond to the plurality of channels and are stored in the memory by alphabetical order, and
    wherein the channel selection controller controls the display part to display a character string, belonging to the second character string group, which is alphabetically previously or next to the character string of the channel being currently displayed, accordingly to the alphabetical order of the stored second character string group, when the signal receiver receives a second forward or backward change signal.

11. The video processing apparatus according to claim 10, wherein a first character of each character string of the second character string group is a different character.

12. A video processing apparatus comprising:
    a memory which stores a plurality of character strings corresponding to a plurality of channels in a predetermined sequence;
    a display part which displays a character string to be superposed on a picture of a corresponding channel;
    a signal receiver which receives a forward or backward change signal for the character string in accordance with a selection of a user;
    a channel selection controller which controls the display part to display a character string previously or next to the character string of the channel being currently displayed such that a previous or next character string is superposed on the picture of the corresponding channel, when the signal receiver receives the forward or backward change signal for the character string; and a remote controller provided with at least two pair of keys, wherein the plurality of character strings is sorted into two or more character string groups and stored in the memory in a predetermined sequence;

the signal receiver further receives a forward or backward change signal for a character string group in accordance with a selection of a user;

the channel selection controller controls the display part to display a character string which belongs to a character string group previously or next to the character string group of the channel being currently displayed such that the previous or next character string is superposed on the picture of the corresponding channel, when the signal receiver receives the forward or backward change signal for the character string group; and the signal receiver receives the forward or backward change signal for the character string, the character string group and a channel number group and receives a signal for selecting a channel number in accordance with a key input of the user from the remote controller.

13. The video processing apparatus according to claim 12, wherein the pair of keys corresponding to the forward and backward change signals for the character string are arranged on the remote controller at upper and lower sides or left and right sides thereof alternately with the pair of keys either corresponding to the forward and backward change signals for the character string group or the channel number group or corresponding to the signal for selecting an increasing or decreasing of the channel number.

14. The video processing apparatus according to claim 13, wherein the channel selection controller controls two pair of character strings, which are changed on the basis of the forward and backward change signals for the character string, and the forward and backward change signals for the character string group or the channel number group, or the signal for increasing or decreasing the channel number, is previously displayed on the display part at upper, lower, left and right sides of the character string of the current channel corresponding with the arrangement of the keys provided in the remote controller.

15. The video processing apparatus according to claim 13, wherein the channel selection controller controls two pair of channel numbers, which are changed on the basis of the forward and backward change signals for the character string, and the forward and backward change signals for the character string group or the channel number group, or the signal for increasing or decreasing the channel number, is previously displayed on the display part at upper, lower, left and right sides of the character string of the current channel corresponding with the arrangement of the keys provided in the remote controller.

16. A video processing apparatus comprising:

a memory which stores a plurality of character strings corresponding to a plurality of channels in a predetermined sequence;

a display part which displays a character string to be superposed on a picture of a corresponding channel;

a signal receiver which receives a forward or backward change signal for the character string in accordance with a selection of a user; and a channel selection controller which controls the display part to display a character string previously or next to the character string of the channel being currently displayed such that a previous or next character string is superposed on the picture of the corresponding channel, when the signal receiver receives the forward or backward change signal for the character string, wherein the memory further stores a plurality of channel numbers corresponding to the plurality of channels, and the plurality of character strings is stored in the memory in an order of channel numbers;

the display part further displays a channel number to be superposed on the picture of the corresponding channel;

the signal receiver further receives a signal for increasing or decreasing the channel number in accordance with selection of a user; and the channel selection controller controls the display part to display a channel number previously or next to the channel number of the channel being currently displayed together with a corresponding character string such that the previous or next channel number is superposed on the picture of the corresponding channel, when the signal receiver receives the signal for increasing or decreasing the channel number.

17. The video processing apparatus according to claim 16, wherein the plurality of channel numbers is sorted into two or more channel number groups and stored in the memory in a predetermined sequence;

the signal receiver further receives a forward or backward change signal for the channel number group in accordance with a selection of a user; and the channel selection controller controls the display part to display the channel number and the character string which belong to the channel number group previously or next to a channel number group of the channel being currently displayed such that the previous or next channel number is superposed on the picture of the corresponding channel, when the signal receiver receives the forward or backward change signal for the channel number group.

18. The video processing apparatus according to claim 17, further comprising a remote controller provided with at least two pair of keys, wherein the signal receiver receives the forward or backward change signal for the character string and the channel number group and receives the signal for increasing or decreasing the channel number in accordance with a key input of the user the from the remote controller.

19. The video processing apparatus according to claim 18, wherein the pair of keys corresponding to the forward and backward change signals for the character string are arranged on the remote controller at upper and lower sides or left and right sides thereof alternately with the pair of keys either corresponding to the forward and backward change signals for the character string group or the channel number group or corresponding to the signal for selecting an increasing or decreasing of the channel number.

20. The video processing apparatus according to claim 19, wherein the channel selection controller controls two pair of character strings, which are changed on the basis of the forward and backward change signals for the character string, and the forward and backward change signals for the character string group or the channel number group, or the signal for increasing or decreasing the channel number, is previously displayed on the display part at upper, lower, left and right sides of the character string of the current channel corresponding with the arrangement of the keys provided in the remote controller.

21. The video processing apparatus according to claim 19, wherein the channel selection controller controls two pair of channel numbers, which are changed on the basis of the forward and backward change signals for the character string, and the forward and backward change signals for the character string group or the channel number group, or the signal for increasing or decreasing the channel number, is previously displayed on the display part at upper, lower, left and right sides of the character string of the current channel corresponding with the arrangement of the keys provided in the remote controller.

22. The video processing apparatus according to claim 16, further comprising a remote controller provided with at least two pair of keys,
wherein the signal receiver receives the forward or backward change signal for the character string, the character string group and a channel number group and receives a signal for increasing or decreasing the channel number in accordance with a key input of the user from the remote controller.

23. The video processing apparatus according to claim 22, wherein the pair of keys corresponding to the forward and backward change signals for the character string are arranged on the remote controller at upper and lower sides or left and right sides thereof alternately with the pair of keys either corresponding to the forward and backward change signals for the character string group or the channel number group or corresponding to the signal for selecting an increasing or decreasing of the channel number.

24. The video processing apparatus according to claim 23, wherein the channel selection controller controls two pair of character strings, which are changed on the basis of the forward and backward change signals for the character string, and the forward and backward change signals for the character string group or the channel number group, or the signal for increasing or decreasing the channel number, is previously displayed on the display part at upper, lower, left and right sides of the character string of the current channel corresponding with the arrangement of the keys provided in the remote controller.

25. The video processing apparatus according to claim 23, wherein the channel selection controller controls two pair of channel numbers, which are changed on the basis of the forward and backward change signals for the character string, and the forward and backward change signals for the character string group or the channel number group, or the signal for increasing or decreasing the channel number, is previously displayed on the display part at upper, lower, left and right sides of the character string of the current channel corresponding with the arrangement of the keys provided in the remote controller.

* * * * *